US008412697B2

(12) United States Patent
Satoh (10) Patent No.: US 8,412,697 B2
(45) Date of Patent: Apr. 2, 2013

(54) SEARCHING APPARATUS AND SEARCHING METHOD

(75) Inventor: Katsuhiko Satoh, Hachioji (JP)

(73) Assignee: Casio Computer Co., Ltd., Tokyo (JP)

(*) Notice: Subject to any disclaimer, the term of this patent is extended or adjusted under 35 U.S.C. 154(b) by 51 days.

(21) Appl. No.: 13/094,012

(22) Filed: Apr. 26, 2011

(65) Prior Publication Data

US 2011/0264675 A1 Oct. 27, 2011

(30) Foreign Application Priority Data

Apr. 27, 2010 (JP) ................................. 2010-102368

(51) Int. Cl.
G06F 7/00 (2006.01)
G06F 17/30 (2006.01)
(52) U.S. Cl. ........................................ 707/706; 707/742
(58) Field of Classification Search ........... 707/999.003, 707/706, 780, 999.004, 742
See application file for complete search history.

(56) References Cited

U.S. PATENT DOCUMENTS

| | | | | |
|---|---|---|---|---|
| 5,418,951 | A * | 5/1995 | Damashek | 1/1 |
| 5,706,365 | A * | 1/1998 | Rangarajan et al. | 707/728 |
| 6,131,082 | A * | 10/2000 | Hargrave et al. | 704/7 |
| 6,292,772 | B1 * | 9/2001 | Kantrowitz | 704/9 |
| 6,701,318 | B2 * | 3/2004 | Fox et al. | 707/706 |
| 7,031,910 | B2 * | 4/2006 | Eisele | 704/10 |
| 7,720,852 | B2 * | 5/2010 | Dunning | 707/750 |
| 8,073,869 | B2 * | 12/2011 | Li et al. | 707/780 |
| 8,175,878 | B1 * | 5/2012 | Chelba et al. | 704/257 |
| 2005/0060643 | A1 * | 3/2005 | Glass et al. | 715/501.1 |
| 2008/0240619 | A1 * | 10/2008 | Kanawa | 382/305 |
| 2011/0320464 | A1 * | 12/2011 | Okato et al. | 707/751 |

FOREIGN PATENT DOCUMENTS

JP 2007-213158 A 8/2007

OTHER PUBLICATIONS

Adams et al., "Trigrams as Index Elements in Full Text Retrieval Observations and Experimental Results", 1993, ACM.*
Japanese Office Action dated Dec. 6, 2011 (and English translation thereof) in counterpart Japanese Application No. 2010-102368.
Y. Ogawa et al; "An Efficient Document Retrieval Method Using n-gram Indexing", IEICE (The Institute of Electronics, Information and Communication Engineers) Journal (D-I), vol. J82-D-I, No. 1, pp. 121-129, Jan. 1999.

* cited by examiner

Primary Examiner — Brannon W Smith
(74) Attorney, Agent, or Firm — Holtz, Holtz, Goodman & Chick, P.C.

(57) ABSTRACT

A searching apparatus includes a memory unit which stores transposed indexes representing appearing positions of all n-grams in plural pieces of document data subjected to searching and appearing frequencies, an n-gram extracting unit that extracts all n-grams extractable from a searching character string, a smallest-frequency deriving unit which refers to the appearing frequency of the n-gram represented by the transposed index, and derives an n-gram with the smallest appearing frequency among all of the extracted n-grams, a searching n-gram selecting unit that selects, from all extracted n-grams, a plurality of searching n-grams which form the searching character string and include the n-gram with the smallest appearing frequency, and a document specifying unit that specifies, based on the plurality of selected searching n-grams and the appearing position of the searching n-gram represented by the transposed index, document data including the searching character string among the plural pieces of document data.

8 Claims, 7 Drawing Sheets

SEARCHING APPARATUS AND SEARCHING METHOD

CROSS-REFERENCE TO RELATED APPLICATION

This application claims the benefit of Japanese Patent Application No. 2010-102368, filed Apr. 27, 2010, the entire disclosure of which is incorporated by reference herein.

FIELD

This application relates generally to a searching apparatus and a searching method which search a document including a specified character string.

BACKGROUND

A technology of searching a desired document among a large amount of computerized documents becomes more important.

When, for example, a document in Japanese having respective words not spaced therebetween is searched, a technique of employing an n-gram as a searching unit is applied.

An n-gram is n number of successive character strings. In a full-text searching based on an n-gram, a searching process of searched files is executed for the number of n-grams extracted from a searching character string. Hence, when a relatively long search character string is used, searching takes time.

Non-patent Literature (Yasushi OGAWA, Toni MATSUDA, "An Efficient Document Retrieval Method Using n-gram Indexing", IEICE (The Institute of Electronics, Information and Communication Engineers) Journal (D-I), Vol. J82-D-I, No. 1, pp. 121-129, January 1999) discloses a document searching technique of obtaining a sum of document frequencies of n-grams as an estimation value of a process time, and of selecting an n-gram used for an actual searching process, thereby speeding up the searching process.

There is a desire for further speeding up of the searching process using an n-gram. Moreover, there is a demand for efficient document searching at a limited process speed and capacity like a compact electronic dictionary loaded in a cellular phone, a portable electronic apparatus, etc.

The present invention has been made in order to overcome the above-explained situation, and it is an object of the present invention to provide a searching apparatus and a searching method which are capable of searching a document including a specified character string more efficiently.

SUMMARY

In order to achieve the above object, a searching apparatus according to a first aspect of the present invention comprises: a memory unit which stores, for each of n-grams (where n is a natural number) extracted from plural pieces of document data subjected to searching, a transposed index representing an appearing position in the plural pieces of document data and an appearing frequency therein, the n-gram being a character string including n number of characters; an n-gram extracting unit that extracts all n-grams which are extractable from a searching character string; a smallest-frequency deriving unit which refers to the appearing frequency of the n-gram represented by the transposed index, and which derives an n-gram with a smallest appearing frequency among all of the n-grams extracted by the n-gram extracting unit; a searching n-gram selecting unit that selects, from all of the n-grams extracted by the n-gram extracting unit, a plurality of searching n-grams which form the searching character string and which include the n-gram with the smallest appearing frequency derived by the smallest-frequency deriving unit; and a document specifying unit that specifies, based on the plurality of searching n-grams selected by the searching n-gram selecting unit and the appearing position of the searching n-gram represented by the transposed index, document data including the searching character string among the plural pieces of document data.

A searching method according to a second aspect of the present invention uses a searching apparatus which stores, for each of n-grams (where n is a natural number) extracted from plural pieces of document data subjected to searching, a transposed index representing an appearing position in the plural pieces of document data and an appearing frequency therein, the n-gram being a character string including n number of characters, and the searching method comprises: an n-gram extracting step of extracting all n-grams which are extractable from a searching character string; a smallest-frequency deriving step of referring to the appearing frequency of the n-gram represented by the transposed index, and of deriving an n-gram with a smallest appearing frequency among all of the n-grams extracted through the n-gram extracting step; a searching n-gram selecting step of selecting, from all of the n-grams extracted through the n-gram extracting step, a plurality of searching n-grams which form the searching character string and which include the n-gram with the smallest appearing frequency derived through the smallest-frequency deriving step; and a document specifying step of specifying, based on the plurality of searching n-grams selected through the searching n-gram selecting step and the appearing position of the searching n-gram represented by the transposed index, document data including the searching character string among the plural pieces of document data.

According to the present invention, it becomes possible to search a document including a specified character string more efficiently.

BRIEF DESCRIPTION OF THE DRAWINGS

A more complete understanding of this application can be obtained when the following detailed description is considered in conjunction with the following drawings, in which.

DETAILED DESCRIPTION

An explanation below will be given of a searching apparatus and a searching method according an embodiment of the present invention.

The explanation for the following embodiment is not for limiting the scope and the spirit of the present invention.

First Embodiment

Figure 1:
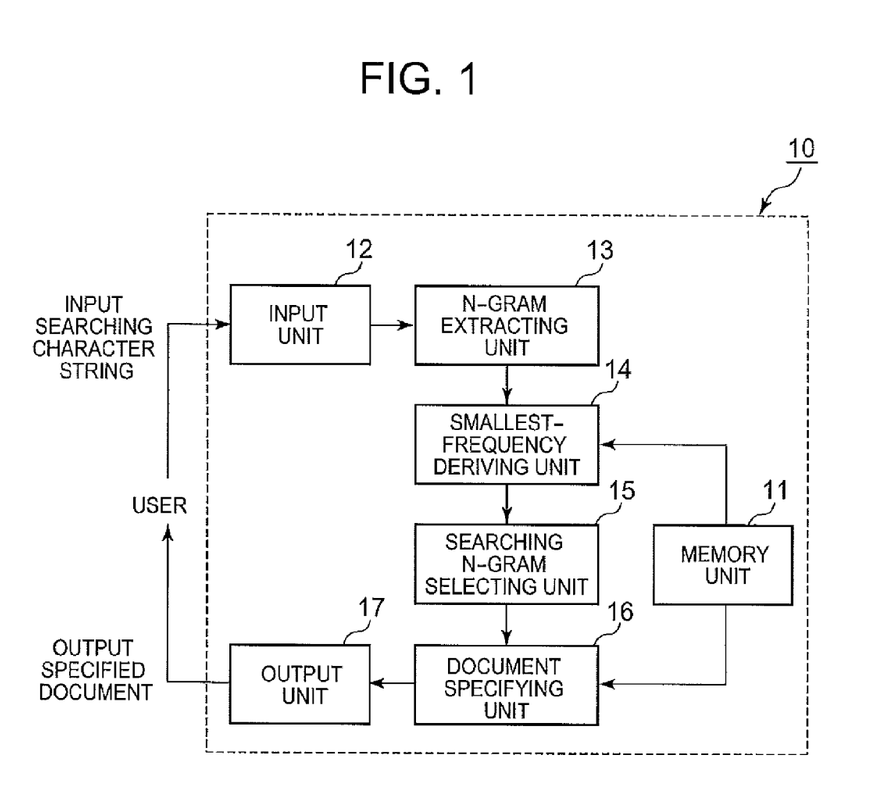
FIG. 1 shows a general configuration of a searching apparatus.

A searching apparatus 10 according to a first embodiment will be explained with reference to FIG. 1.

The searching apparatus 10 includes a memory unit 11, an input unit 12, an n-gram extracting unit 13, a smallest-frequency deriving unit 14, a searching n-gram selecting unit 15, a document specifying unit 16, and an output unit 17.

The memory unit 11 stores transposed indexes corresponding to plural pieces of document data subjected to searching. The transposed index contains, for each n-gram extracted from plural pieces of document data, the appearing position and the appearing frequency thereof. The memory unit 11 comprises, for example, a hard disk device.

When a document represented by a piece of document data includes $N_{doc}$ number of character strings, $N_{doc}-N+1$ number of n-grams (n character strings) are extracted. The memory unit 11 stores, regarding the n-grams of an identical character string pattern extracted from each of the plural pieces of document data, transposed indexes representing appearing positions and appearing frequencies.

The input unit 12 receives a searching character string input by a user. The input unit 12 supplies the received searching character string to the n-gram extracting unit 13. More specifically, the input unit 12 comprises input devices, such as a keyboard and a touch panel.

The n-gram extracting unit 13 extracts all n-grams from the searching character string received from the input unit 12. The n-gram extracting unit 13 supplies the extracted n-grams to the smallest-frequency deriving unit 14. The n-gram extracting unit 13 comprises, for example, a CPU of a computer apparatus.

When the searching character string comprises M number of characters, the n-gram extracting unit 13 extracts $M-N+1$ number of n-grams from the searching character string.

The smallest-frequency deriving unit 14 derives an n-gram with the smallest appearing frequency for plural pieces of document data among all n-grams extracted by the n-gram extracting unit 13 based on the appearing frequency included in the transposed index stored in the memory unit 11. The smallest-frequency deriving unit 14 supplies the n-gram extracted by the n-gram extracting unit 13 and the n-gram with the smallest appearing frequency to the searching n-gram selecting unit 15.

The smallest-frequency deriving unit 14 derives an n-gram with the smallest appearing frequency among the $M-N+1$ number of n-grams.

Figure 4:
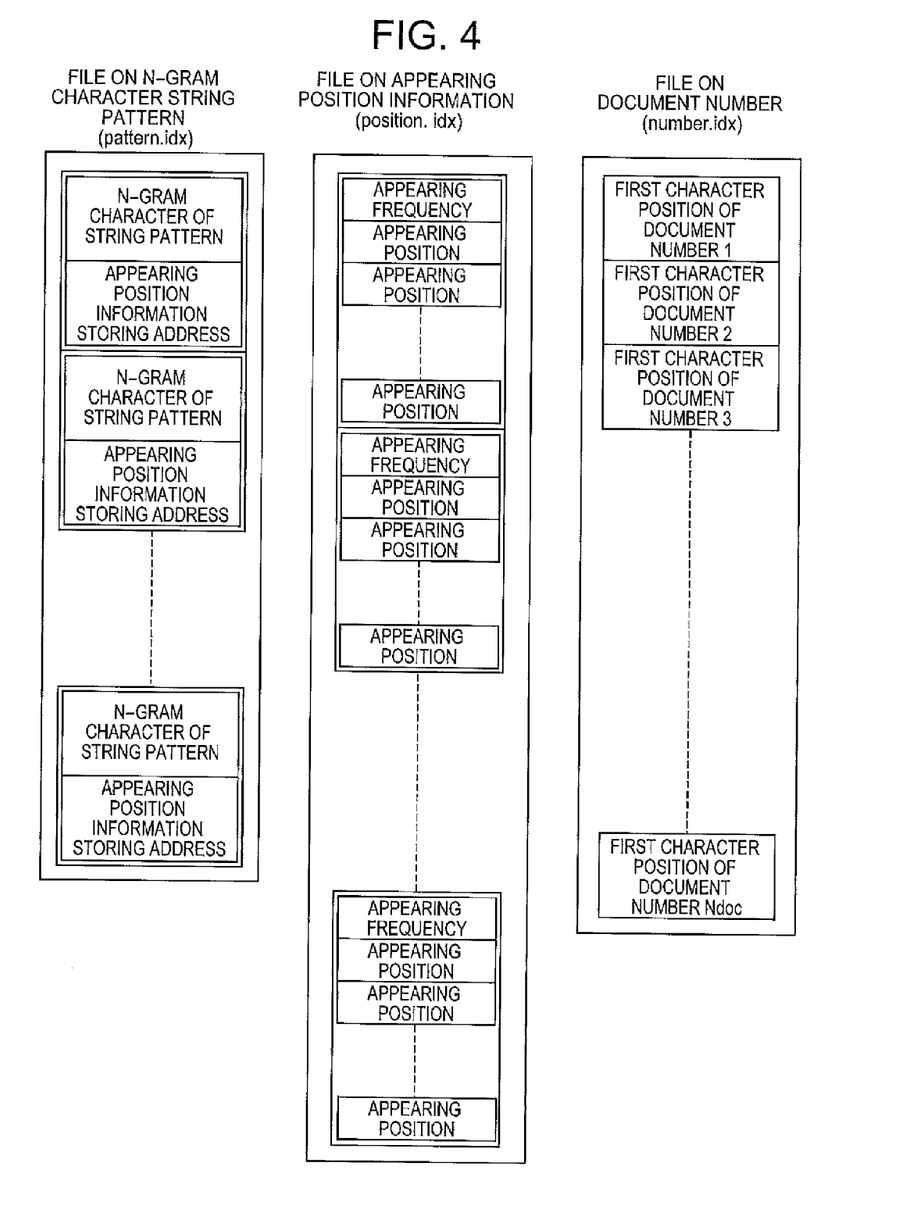
FIG. 4 is a diagram showing a specific configuration of a transposed index.

An explanation will be given of a specific configuration of a transposed index 29 according to the present embodiment with reference to FIG. 4. The transposed index 29 includes three files: a file (pattern. idx) written with n-gram character string pattern and appearing position information storing addresses; a file (position.idx) written with appearing frequencies of individual n-gram character string pattern and appearing positions thereof; and a file (number.idx) written with document numbers and first character positions of respective documents.

The appearing position is a position of a character from the beginning of texts where documents subjected to searching are arranged in the order of document number. The first character position of each document number is a position of the first character of each document from the beginning of the texts where documents subjected to searching are arranged in the order of document number.

The searching n-gram selecting unit 15 selects plural searching n-grams configuring a searching character string and including an n-gram with the smallest appearing frequency derived by the smallest-frequency deriving unit 14 from all n-grams extracted by the n-gram extracting unit 13. The searching n-gram selecting unit 15 supplies the selected plural searching n-grams to the document specifying unit 16.

N-grams having respective positions adjoining to each other among all n-grams extracted by the n-gram extracting unit 13 have an overlap of characters. Hence, in order to specify document data to be discussed later, it is not necessary to use all of the extracted n-grams, but n-grams configuring a searching character string are used.

The searching n-gram selecting unit 15 selects searching n-grams configuring a searching character string from all n-grams extracted by the n-gram extracting unit 13.

The selected n-grams are always caused to include an n-gram with the smallest appearing frequency derived by the smallest-frequency deriving unit 14. By using the n-gram with the smallest appearing frequency for specifying of document data to be discussed later, document data can be refined efficiently.

The document specifying unit 16 specifies document data including a searching character string among plural pieces of document data based on the plural searching n-grams selected by the searching n-gram selecting unit 15 and the appearing position information of the transposed index stored in the memory unit 11. The document specifying unit 16 supplies the specified document data to the output unit 17.

That is, the document specifying unit 16 determines whether or not the plural n-grams successively appear in the order of searching character string, and specifies document data having undergone determination that the plural n-grams appear successively.

The output unit 17 outputs document data specified by the document specifying unit 16 to the user. More specifically, information on document data is output using an output device like a display.

An explanation will be given of a general configuration of a computer apparatus that physically configures the searching apparatus 10 shown in FIG. 1 with reference to FIGS. 2A and 2B.

Figure 2A:
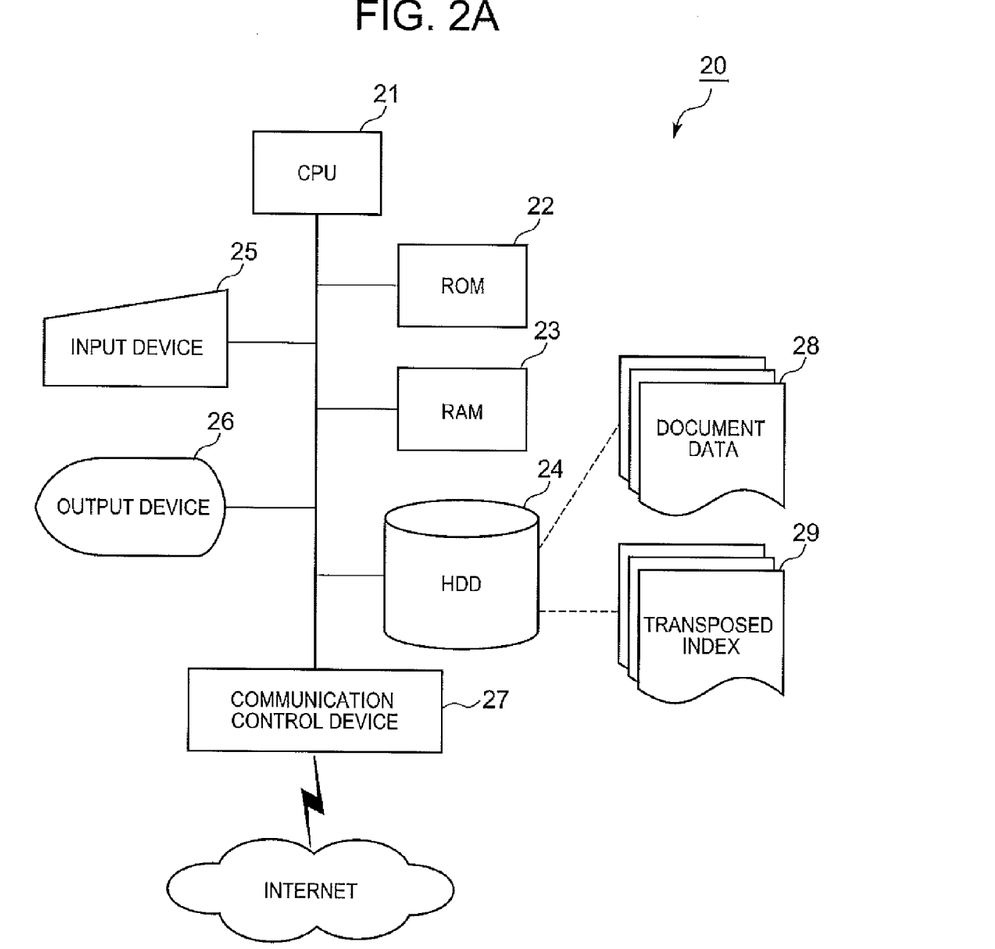
FIG. 2A is a diagram showing an illustrative general configuration of a computer apparatus that configures the searching apparatus.
Figure 2B:
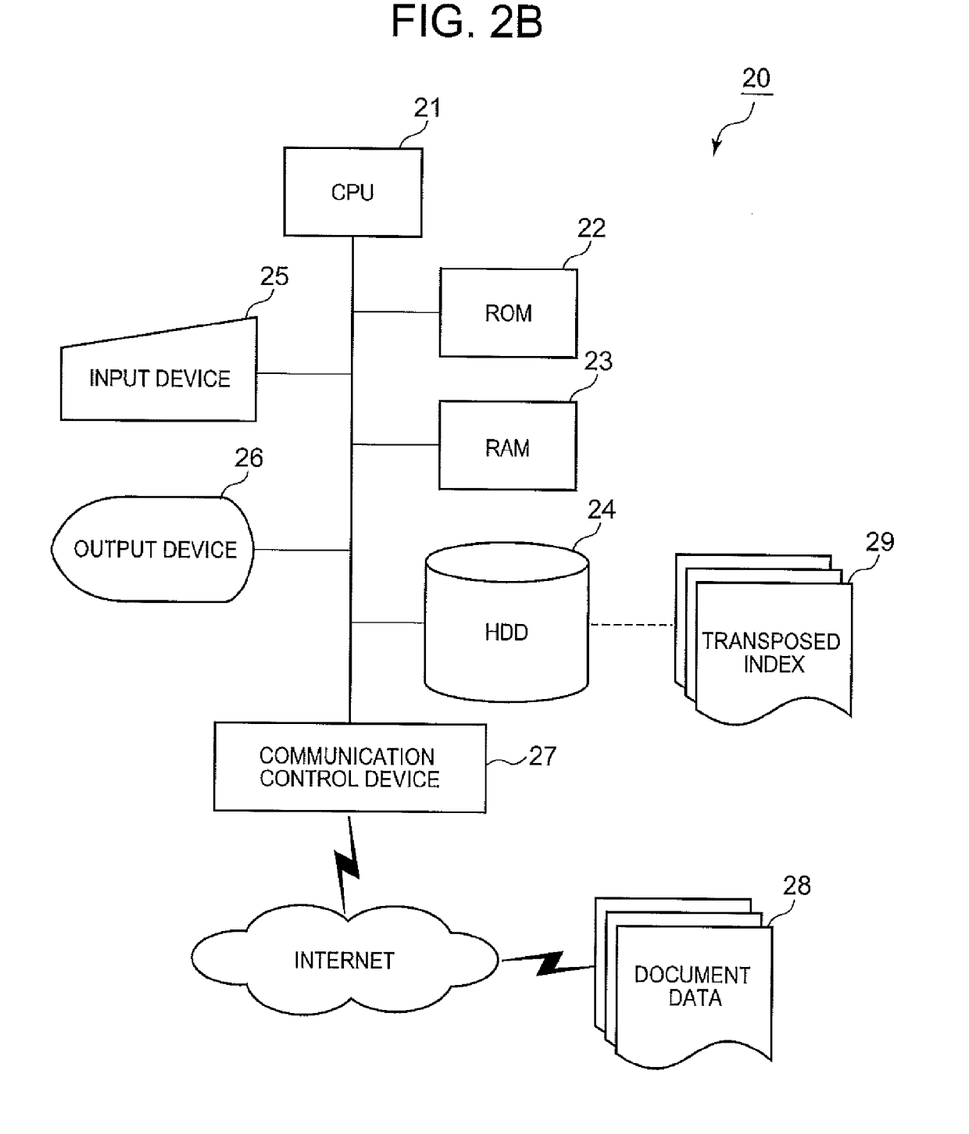
FIG. 2B is a diagram showing another illustrative general configuration of a computer apparatus that configures the searching apparatus.

In FIG. 2A, a computer apparatus 20 includes a CPU (Central Processing Unit) 21, a ROM (Read Only Memory) 22, a RAM (Random Access Memory) 23, an HDD (Hard Disk Drive) 24, an input device 25, an output device 26, and a communication control device 27. Individual structural elements are connected together through a system bus that is a transmission path for transmitting an instruction, data, and the like.

The CPU 21 controls the operation of the whole computer apparatus 20, and exchanges a control signal and data with individual structural elements.

The ROM 22 stores a computer program and various data necessary for the computer apparatus 20 to operate. The ROM 22 stores, in particular, a computer program and various data necessary for a searching process.

The RAM 23 temporarily stores data and the computer program. The RAM 23 retains the computer program and data read from the ROM 22 and data necessary for progressing other processes.

The HDD 24 stores data, etc., necessary for the searching process. In particular, the HDD 24 stores, for each of plural pieces of document data 28 subjected to searching, and n-grams extracted from plural pieces of document data 28, the transposed index 29 including an appearing position in the plural pieces of document data 28 and an appearing frequency as structural elements.

The input device 25 comprises, for example, a keyboard and a touch panel. The input device 25 receives an input given by the user. The input device 25 supplies, in particular, a searching character string input by the user to the n-gram extracting unit 13.

The output device 26 comprises, for example, a display. The output device 26 outputs a process result by the computer apparatus 20. The output device 26 outputs, in particular, the document data 28 including a searching character string and specified by the document specifying unit 16 to the user.

The communication control device 27 connects the computer apparatus 20 to a computer communication network like the Internet. The communication control device 27 is used to connect the computer apparatus 20 and to exchange data over the communication network. For example, the plural pieces of document data 28 may be obtained through the communication control device 27.

Moreover, the plural pieces of document data 28 may be present outside the computer apparatus 20. This example case will be explained with reference to FIG. 2B.

The plural pieces of document data 28 are not present in the HDD 24, but are present outside the computer apparatus 20. In this case, the communication control device 27 is connected to the document data 28 through the computer communication network.

In this case, it is not necessary to store the document data 28 in the computer apparatus 20. Moreover, document searching is enabled through an electronic apparatus with a limited capacity like a compact electronic dictionary as long as it can be connected to the Internet.

Figure 3:
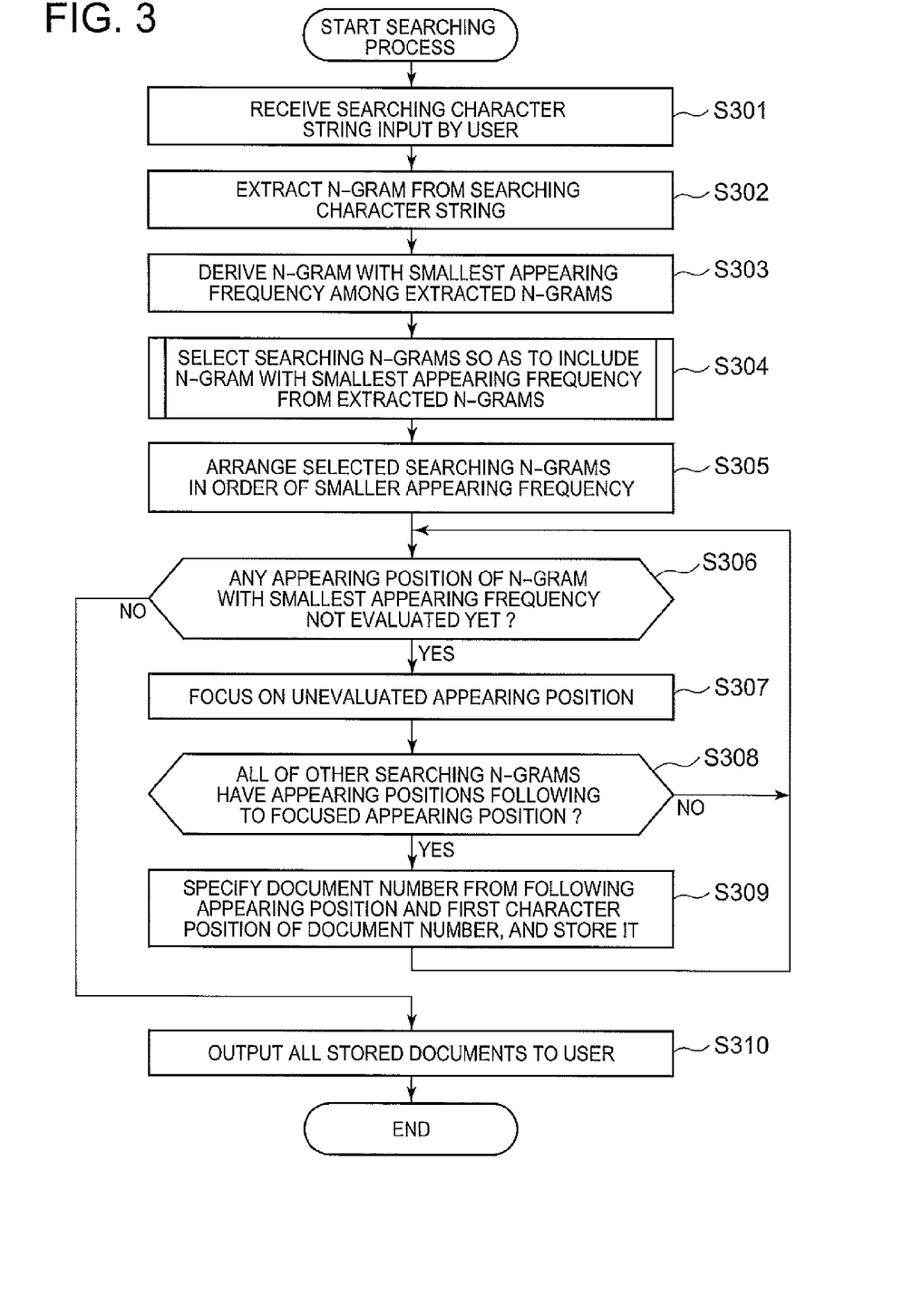
FIG. 3 is a flowchart showing a flow of a searching process by the searching apparatus.

A specific operation of the searching process by the searching apparatus 10 employing the above-explained configuration will be explained with reference to FIG. 3.

The input unit 12 receives a searching character string from the user (step S301). The input unit 12 supplies the received searching character string to the n-gram extracting unit 13. The n-gram extracting unit 13 receives the searching character string from the input unit 12. The n-gram extracting unit 13 extracts all n-grams from the received searching character string (step S302).

More specifically, it is presumed that the user inputs a searching character string like "ABCDEFGHI" which contains 9 characters "A", "B", "C", "D", "E", "F", "G", "H", and "I" for example, in Japanese. In the case of searching process with N=2, the n-gram extracting unit 13 extracts, from the front in the order, eight (9−2+1) n-grams (bigrams) that are "AB", "BC", "CD", "DE", "EF", "FG", "GH", and "HI" each of which is expressed by two characters in Japanese. Moreover, in the case of searching process with N=3, the n-gram extracting unit 13 extracts, from the front in the order, seven (9−3+1) n-grams (trigrams) that are "ABC", "BCD", "CDE", "DEF", "EFG", "FGH", and "GHI" each of which is expressed by three characters in Japanese.

The value of N is set beforehand by the searching apparatus 10. The value of N can be 2, 3, or other natural number. In the following explanation, in order to simplify the explanation, cases in which N=2 or 3 will be explained.

Next, the smallest-frequency deriving unit 14 derives an n-gram with the smallest appearing frequency among all extracted n-grams (step S303). The appearing frequency is included in the transposed index 29 stored in the memory unit 11. The smallest-frequency deriving unit 14 refers to the appearing frequency corresponding to each of all extracted n-grams, thereby deriving the n-gram with the smallest appearing frequency.

When there are plural n-grams with the smallest appearing frequency, the smallest-frequency deriving unit 14 gives a preference, for example, to n-gram with a position in the searching character string forward and derives such an n-gram. Moreover, among the plural n-grams extracted from the searching character string, when there is no transposed index corresponding to the n-gram, the searching character string is not present in the plural pieces of document data 28 subjected to be searched. In this case, for example, the smallest-frequency deriving unit 14 outputs a message like "no searching character string found" to the user, and terminates the process (which is not illustrated).

Next, the searching n-gram selecting unit 15 selects searching n-grams among all of the extracted n-grams so as to contain the derived n-gram with the smallest appearing frequency (step S304). The detail of the selection process will be explained with reference to the flowchart of FIG. 5.

Figure 5:
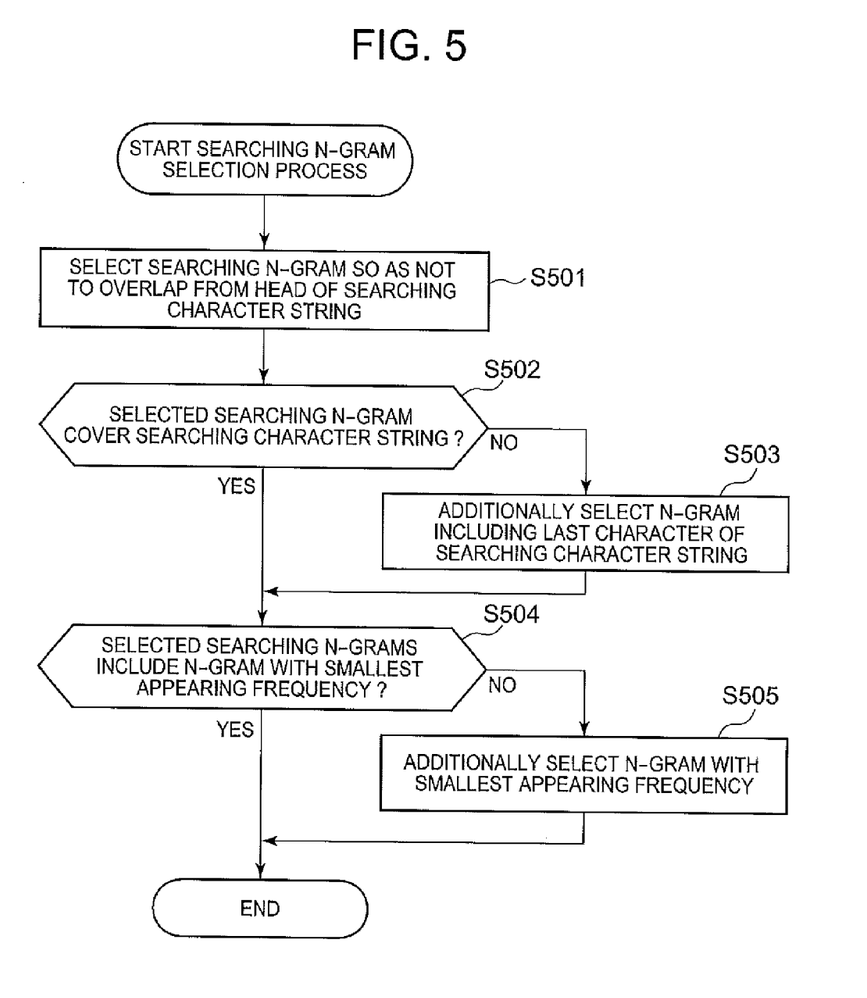
FIG. 5 is a flowchart showing a flow of a selection process for a searching n-gram according to a first embodiment.

An explanation will be given below of the selection process of the searching n-grams with reference to FIG. 5.

The searching n-gram selecting unit 15 selects searching n-grams from the head for the searching character string so as not to overlap (step S501).

For example, when the searching character string is "ABCDEFGHI" and the searching process with N=2 is executed, the searching n-gram selecting unit 15 selects four n-grams that are "AB", "CD", "EF", and "GH" each of which are expressed by two characters in Japanese so as not to overlap one another from the head.

The searching n-gram selecting unit 15 determines whether or not the searching character string is formed by the selected searching n-grams (step S502). For example, in the case of the four n-grams (bigrams) selected as explained above, a last character of the searching character string which expresses a part "I" of the last word is not included (step S502: NO). In this case, the searching n-gram selecting unit 15 additionally selects an n-gram including the last character of the searching character string in Japanese as a searching n-gram (step S503).

In the above-explained case, "HI" including the last character "I" of the searching character string in Japanese is additionally selected as a searching n-gram. The searching n-gram selecting unit 15 selects five bigrams that are "AB", "CD", "EF", "GH", and "HI". Accordingly, the searching character string "ABCDEFGHI" is formed by the selected n-grams. The five bigrams correspond to the minimum number ([9 characters/2 characters]=5, [x] represents a minimum natural number equal to or larger than x) configuring the searching character string expressed by nine characters in Japanese.

Conversely, in the case of the searching process with N=3, the searching n-gram selecting unit 15 selects three searching n-grams that are "ABC", "DEF", and "GHI" each of which are expressed by three characters in Japanese. In this case, the searching character string "ABCDEFGHI" can be formed by the selected n-grams. The three trigrams correspond to the minimum number ([9 characters/3 characters]=3) configuring the searching character string expressed by nine characters in Japanese.

The searching n-gram selecting unit 15 determines whether or not the n-gram with the smallest appearing frequency derived in the step S303 is included in the selected searching n-gram (step S504).

When the n-gram (bigram) with the smallest appearing frequency derived in the step S303 is "GH", the "GH" is included in the five bigrams which are selected by the searching n-gram selecting unit 15 and which are "AB", "CD", "EF", "GH", and "HI" in the above-explained example case. In this case, the searching n-gram selecting unit 15 terminates the selection process of the searching n-grams. That is, five bigrams "AB", "CD", "EF", "GH", and "HI" are eventually selected.

Conversely, when the n-gram (bigram) with the smallest appearing frequency derived in the step S303 is "BC", it is not included in the five bigrams (step S504: NO). In this case, the searching n-gram selecting unit 15 additionally selects the n-gram with the smallest appearing frequency as a searching n-gram (step S505). Thereafter, the searching n-gram selecting unit 15 terminates the selection process of the searching n-grams. That is, in this case, six bigrams "AB", "BC", "CD", "EF", "GH", and "HI" are eventually selected.

Returning to FIG. 3, the document specifying unit 16 executes a process of specifying the document data 28 including the searching character string using the searching n-grams selected in the step S304. An explanation will be given of a case in which five bigrams "AB", "CD", "EF", "GH", and "HI" are selected in the step S304.

The document specifying unit 16 arranges the selected searching n-grams in the order of smaller appearing frequency (step S305). This process is executed based on the appearing frequency included in the transposed index 29. Regarding respective appearing frequencies of the five bigrams, when "AB" is ten times, "CD" is eight times, "EF" is five times, "GH" is three times, and "HI" is thirteen times, such five bigrams are arranged in the order of smaller appearing frequency like "GH", "EF", "CD", "AB" and "HI".

The document data 28 to be specified includes all searching n-grams. Searching of the document data 28 with reference to the n-gram with a smaller appearing frequency has a better searching efficiency than searching of the document data 28 with reference to the n-gram with a larger appearing frequency.

Next, the document specifying unit 16 determines whether or not an appearing position corresponding to the n-gram with the smallest appearing frequency is not evaluated yet (step S306). When the three appearing positions of the bigram "GH" with the smallest appearing frequency are "100th character", "300th character", and "700th character" in the plural pieces of document data 28, respective appearing positions are not evaluated yet (step S306: YES), and in this case, the process progresses to step S307.

The document specifying unit 16 focuses on the appearing position not yet evaluated (step S307). Respective three appearing positions "100th character", "300th character", and "700th character" of the bigram "GH" with the smallest appearing frequency are all not evaluated yet. In this case, the document specifying unit 16 focuses on "100th character" that is the first appearing position.

The document specifying unit 16 determines whether or not the focused appearing position and the following appearing position include all of the other searching n-grams (step S308). More specifically, bigrams are selected in the order of the smaller appearing frequency, and following determination processes (a) to (d) are executed. Through such processes, the document specifying unit 16 determines whether or not the appearing positions of respective bigrams form the searching character string "ABCDEFGHI".

(a) The searching bigram "EF" is located two characters (in Japanese) ahead of the bigram "GH" with the smallest appearing frequency. The document specifying unit 16 determines whether or not there is an appearing position of the "98th character (=100−2nd character)" among the five appearing positions of the "EF".

(b) The searching bigram "CD" is located four characters (in Japanese) ahead of the bigram "GH" with the smallest appearing frequency. The document specifying unit 16 determines whether or not there is an appearing position of the "96th character (=100−4th character)" among the eight appearing positions of "CD".

(c) The searching bigram "AB" is located six characters (in Japanese) ahead of the bigram "GH" with the smallest appearing frequency. The document specifying unit 16 determines whether or not there is an appearing position of the "94th character (=100−6th character)" among the ten appearing positions of "AB".

(d) The searching bigram "HI" is located one character (in Japanese) behind the bigram "GH" with the smallest appearing frequency. The document specifying unit 16 determines whether or not there is an appearing position of the "101st character (=100+1st character)" among the thirteen appearing positions of "HI".

When it is determined that there is no other searching n-gram at an appearing position following to the focused appearing position through at least any one of (a) to (d) (step S308: NO), the document specifying unit 16 returns the process to the step S306, and in the step S307, a next appearing position which is not yet evaluated, i.e., the "300th character" in this case is focused. The document specifying unit 16 executes the determination process again at the step S308 for the focused "300th character".

Conversely, when it is determined that there are all of the other searching n-grams at the appearing positions following to the focused appearing position through (a) to (d) (step S308: YES), the document specifying unit 16 determines that the searching character string "ABCDEFGHI" is present at that position. In this case, the document specifying unit 16 (the searching apparatus 10) specifies the number (the document number) of the document including the searching character string, and stores the specified number (step S309).

Next, the process returns to the step S306, and it is determined again whether or not there is an appearing position which corresponds to the n-gram with the smallest appearing frequency and which is not yet evaluated. More specifically, in the above-explained example case, when the current process is focusing on the first "100th character", the "300th character" and the "700th character" are not evaluated yet (step S309: YES), so that the process returns to the step S307, and the document specifying unit 16 executes the process focusing on the appearing positions not yet evaluated.

Conversely, when all of the appearing positions corresponding to the n-gram with the smallest appearing frequency are evaluated (step S306: NO), the output unit 17 outputs the document data 28 corresponding to all document numbers stored in the step S309 to the user (step S310). Through the above-explained procedures, the process completes. The document data 28 is output by the times corresponding to the number of the process at 5309 executed, i.e., by what corresponds to the number of specifying of the document including the searching character string.

When none of the document including the searching character string is specified, in the step S310, the output unit 17 outputs a message like "no searching character string found" to the user.

As explained above, according to the first embodiment, both of high-speed searching n-gram selection process that is a simple process of selecting a searching n-gram so as not to overlap from the first character in the searching character string and efficient document specifying process of selecting a few (the minimum limit configuring the searching character string plus 1) searching n-grams including an n-gram with the smallest appearing frequency are enabled.

Hence, a compact electronic dictionary, etc., loaded in a cellular phone or a portable electronic apparatus with a limited process speed and capacity is enabled to perform efficient searching.

Second Embodiment

Next, an explanation will be given of a second embodiment of the present invention. According to the first embodiment, when searching n-grams are selected, such searching n-grams are selected so as not to overlap in the order from the head of the searching character string. According to the second embodiment, searching n-grams are selected with reference to the position of an n-gram with the smallest appearing frequency in the searching character string. The detail of the second embodiment will be explained below.

The explanation for the same features as those of the first embodiment will be omitted below. The second embodiment has a different selection process (see FIG. 5) of searching n-grams from that of the first embodiment.

Figure 6:
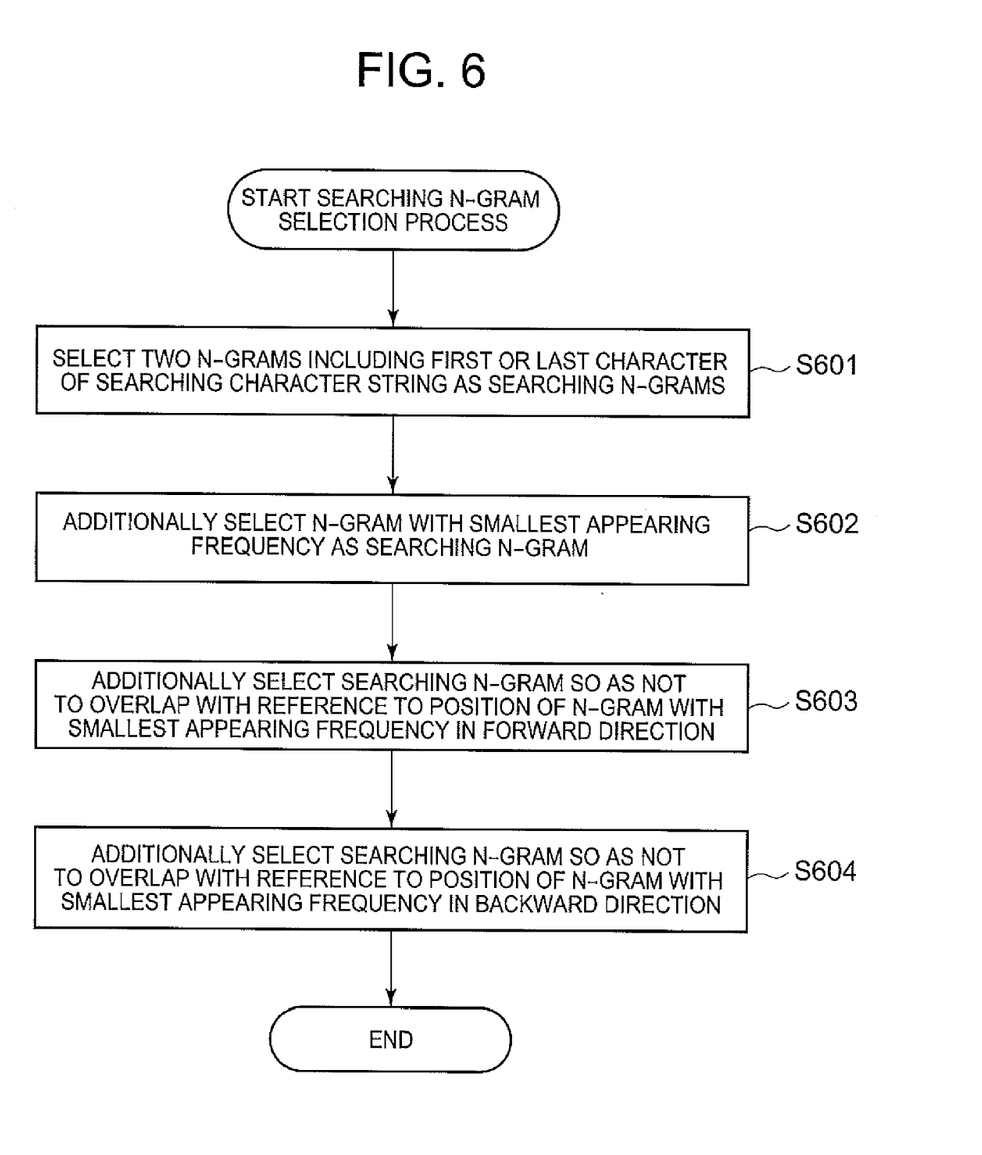
FIG. 6 is a flowchart showing a flow of a selection process for a searching n-gram according to a second embodiment.

The selection process of searching n-grams according to the second embodiment will be explained with reference to FIG. 6.

The searching n-gram selecting unit 15 selects, as the searching n-grams, two n-grams including the head or the last character of the searching character string among all n-grams extracted by the n-gram extracting unit 13 (step S601).

More specifically, when, for example, the searching character string is "ABCDEFGHIJKL" which contains 12 characters "A", "B", "C", "D", "E", "F", "G", "H", "I", "J" "K" and "L", in Japanese, the n-gram extracting unit 13 extracts, through the searching process with N=2, all of 11 n-grams (bigrams) that are "AB", "BC", "CD", "DE", "EF", "FG", "GH", "HI", "IJ", "JK", and "KL", each of which includes two characters in Japanese. The searching n-gram selecting unit 15 selects in the step S601 the two n-grams "AB" and "KL" which are the head and the last of the searching character string, respectively.

Next, the searching n-gram selecting unit 15 adds an n-gram with the smallest appearing frequency to the searching n-grams (step S602). The searching n-gram selecting unit 15 selects and adds a searching n-gram so as not to overlap the selected searching n-grams frontward and backward of the position of the n-gram with the smallest appearing frequency (steps S603, S604).

More specifically, in the above-explained example case, when the bigram with the smallest appearing frequency is "EF", this bigram "EF" is selected in the step S602 as a searching n-gram. Moreover, in the step S603, a forward n-gram, i.e., "CD" is selected so as not to overlap the selected n-gram with reference to "EF". Furthermore, in the step S604, with reference to "EF", backward n-grams, i.e., "GH" and "IJ" are selected so as not to overlap the selected n-gram.

In this example case, the first character of the bigram with the smallest appearing frequency is located at an odd number position in the searching character string. Other bigrams with a first character located at an odd number position are selected. In this example case, the selected searching n-grams include the bigram with the smallest appearing frequency and the number of such selected searching n-grams corresponds to the minimum number of bigrams for forming the searching character string.

As a result, in the above-explained case, six bigrams "AB", "CD", "EF", "GH", "IJ", and "KL" are selected as searching n-grams. The selected searching n-grams include the bigram with the smallest appearing frequency and form the searching character string.

On the other hand, as another example case, when the bigram with the smallest appearing frequency is "FG", this bigram "FG" is selected in the step S602 as the searching n-gram. Moreover, frontward n-grams, i.e., "DE" and "BC" are selected in the step S603 so as not to overlap the selected searching n-gram with reference to "FG". Furthermore, backward n-grams, i.e., "HI" and "JK" are selected in the step S604 so as not to overlap the selected searching n-gram with reference to "FG".

In this example case, the first character of the bigram with the smallest appearing frequency is located at an even number position in the searching character string. Moreover, other bigrams with the first character located at an even number position are selected.

As a result, in the above-explained example case, seven bigrams "AB", "BC", "DE", "FG", "HI", "JK" "KL" are selected as searching n-grams. In this example case, the selected searching n-grams include the bigram with the smallest appearing frequency, and the number of such selected searching n-grams is larger by one than the minimum number of bigrams forming the searching character string.

Based on the searching n-grams selected through the above-explained process, the document specifying unit 16. executes the process of specifying the document data 28 including the searching character string as explained in the first embodiment.

As explained above, according to the second embodiment, with reference to the n-gram with the smallest appearing frequency, n-grams forming the searching character string are selected. Accordingly, a few (the minimum number of forming the searching character string or this number plus one) searching n-grams surely including the n-gram with the smallest appearing frequency can be selected. This enables both high-speed searching n-gram selection process and efficient document specifying process.

Respective structural elements of the searching apparatus 10 may be realized by a computer program that allows the computer apparatus 20 to function.

The computer program can be stored in a computer-readable information memory medium, such as a compact disk, a flexible disk, a hard disk, a magneto-optical disk, digital video disk, a magnetic tape, or a semiconductor memory, and the like.

The computer program can be distributed and sold over a computer communication network independently from the computer apparatus 20 that runs the computer program. Moreover, the information memory medium can be distributed and sold independently from the computer apparatus 20.

Having described and illustrated the principles of this application by reference to one or more preferred embodiments, it should be apparent that the preferred embodiments may be modified in arrangement and detail without departing from the principles disclosed herein and that it is intended that the application be construed as including all such modifications and variations insofar as they come within the spirit and scope of the subject matter disclosed herein.

What is claimed is:

1. A searching apparatus comprising:
   a memory unit which stores, for each of a plurality of n-grams (where n is a natural number) extracted from plural pieces of document data subjectable to searching, a transposed index representing appearing positions in the plural pieces of document data and an appearing frequency, wherein each n-gram is a character string including n number of characters;

an n-gram extracting unit which extracts all n-grams which are extractable from a searching character string;

a smallest-frequency deriving unit which refers to the appearing frequencies of the plurality of n-grams represented by the transposed indexes, and which derives an n-gram with a smallest appearing frequency among all of the n-grams extracted by the n-gram extracting unit;

a searching n-gram selecting unit which:
 (a) divides the searching character string n-gram by n-gram from a first character of the searching character string so that one n-gram does not overlap with another n-gram, and selects the divided n-grams from among all of the n-grams extracted by the n-gram extracting unit,
 (b) additionally selects an n-gram including a last character of the searching character string when the selected n-grams do not form the searching character string, and
 (c) additionally selects the n-gram with the smallest appearing frequency when the n-gram with the smallest appearing frequency derived by the smallest-frequency deriving unit is not included in the n-grams selected through (a) and (b), and a document specifying unit which specifies, based on the plurality of searching n-grams selected by the searching n-gram selecting unit and based on the appearing positions of the searching n-grams represented by the transposed indexes, document data including the searching character string among the plural pieces of document data.

2. The searching apparatus according to claim 1, wherein using the plurality of searching n-grams selected by the searching n-gram selecting unit in an order of smaller appearing frequency represented by the transposed indexes, the document specifying unit specifies the document data including the searching character string among the plural pieces of document data based on whether or not all of the other searching n-grams are present at an appearing position of a searching n-gram and at a following appearing position.

3. A searching apparatus comprising:

a memory unit which stores, for each of a plurality of n-grams (where n is a natural number) extracted from plural pieces of document data subjectable to searching, a transposed index representing appearing positions in the plural pieces of document data and an appearing frequency, wherein each n-gram is a character string including n number of characters;

an n-gram extracting unit which extracts all n-grams which are extractable from a searching character string;

a smallest-frequency deriving unit which refers to the appearing frequencies of the plurality of n-grams represented by the transposed indexes, and which derives an n-gram with a smallest appearing frequency among all of the n-grams extracted by the n-gram extracting unit;

a searching n-gram selecting unit which:
 (a) selects an n-gram including a first or last character of the searching character string among all of the n-grams extracted by the n-gram extracting unit,
 (b) additionally selects the n-gram with the smallest appearing frequency derived by the smallest-frequency deriving unit, and
 (c) divides the searching character string n-gram by n-gram so that one n-gram does not overlap with another n-gram with reference to a position of the n-gram with the smallest appearing frequency in the searching character string in a direction frontward or backward of that position, and additionally selects a divided n-gram not selected through (a); and a document specifying unit which specifies, based on the plurality of searching n-grams selected by the searching n-gram selecting unit and based on the appearing positions of the searching n-grams represented by the transposed indexes, document data including the searching character string among the plural pieces of document data.

4. The searching apparatus according to claim 3, wherein using the plurality of searching n-grams selected by the searching n-gram selecting unit in an order of smaller appearing frequency represented by the transposed indexes, the document specifying unit specifies the document data including the searching character string among the plural pieces of document data based on whether or not all of the other searching n-grams are present at an appearing position of a searching n-gram and at a following appearing position.

5. A searching method using a searching apparatus which stores, for each of a plurality of n-grams (where n is a natural number) extracted from plural pieces of document data subjectable to searching, a transposed index representing appearing positions in the plural pieces of document data and an appearing frequency, wherein each n-gram is a character string including n number of characters, the searching method comprising:

an n-gram extracting step of extracting all n-grams which are extractable from a searching character string;

a smallest-frequency deriving step of referring to the appearing frequencies of the plurality of n-grams represented by the transposed indexes, and deriving an n-gram with a smallest appearing frequency among all of the n-grams extracted through the n-gram extracting step;

a searching n-gram selecting step of:
 (a) dividing the searching character string n-gram by n-gram from a first character of the searching character string so that one n-gram does not overlap with another n-gram, and selecting the divided n-grams from among all of the n-grams extracted through the n-gram extracting step,
 (b) additionally selecting an n-gram including a last character of the searching character string when the selected n-grams do not form the searching character string, and
 (c) additionally selecting the n-gram with the smallest appearing frequency when the n-gram with the smallest appearing frequency derived through the smallest-frequency deriving step is not included in the n-grams selected through (a) and (b); and a document specifying step of specifying, based on the plurality of searching n-grams selected through the searching n-gram selecting step and based on the appearing positions of the searching n-grams represented by the transposed indexes, document data including the searching character string among the plural pieces of document data.

6. The searching method according to claim 5, wherein using the plurality of selected searching n-grams in an order of smaller appearing frequency represented by the transposed indexes, the document data including the searching character string is specified among the plural pieces of document data based on whether or not all of the other searching n-grams are present at an appearing position of a searching n-gram and at a following appearing position.

7. A searching method using a searching apparatus which stores, for each of a plurality of n-grams (where n is a natural number) extracted from plural pieces of document data subjectable to searching, a transposed index representing appearing positions in the plural pieces of document data and an appearing frequency, wherein each n-gram is a character string including n number of characters, the searching method comprising:

an n-gram extracting step of extracting all n-grams which are extractable from a searching character string;

a smallest-frequency deriving step of referring to the appearing frequencies of the plurality of n-grams represented by the transposed indexes, and deriving an n-gram with a smallest appearing frequency among all of the n-grams extracted through the n-gram extracting step;

a searching n-gram selecting step of:
        (a) selecting an n-gram including a first or last character of the searching character string among all of the n-grams extracted through the n-gram extracting step,
        (b) additionally selecting the n-gram with the smallest appearing frequency derived through the smallest-frequency deriving step, and
        (c) dividing the searching character string n-gram by n-gram so that one n-gram does not overlap with another n-gram with reference to a position of the n-gram with the smallest appearing frequency in the searching character string in a direction frontward or backward of that position, and additionally selecting a divided n-gram not selected through (a); and     a document specifying step of specifying, based on the plurality of searching n-grams selected through the searching n-gram selecting step and based on the appearing positions of the searching n-grams represented by the transposed indexes, document data including the searching character string among the plural pieces of document data.

8. The searching method according to claim 7, wherein using the plurality of selected searching n-grams in an order of smaller appearing frequency represented by the transposed indexes, the document data including the searching character string is specified among the plural pieces of document data based on whether or not all of the other searching n-grams are present at an appearing position of a searching n-gram and at a following appearing position.

* * * * *